United States Patent [19]

Dalke

[11] Patent Number: 5,442,665
[45] Date of Patent: Aug. 15, 1995

[54] STRAIN GAUGE INSTRUMENTATION DEVICE FOR IN-CORE MONITOR HOUSINGS

[75] Inventor: Charles A. Dalke, San Jose, Calif.

[73] Assignee: General Electric Company, Schenectady, N.Y.

[21] Appl. No.: 227,747

[22] Filed: Apr. 13, 1994

[51] Int. Cl.$^6$ .............................. G21C 17/00
[52] U.S. Cl. ........................ 376/245; 376/252; 376/249; 376/247; 376/246
[58] Field of Search ............ 376/252, 246, 247, 249, 376/245; 81/419; 73/862, 474; 248/51, 62, 68.1, 73

[56] References Cited

U.S. PATENT DOCUMENTS

| | | | |
|---|---|---|---|
| 3,781,453 | 12/1973 | Funk et al. | 174/11 R |
| 4,094,369 | 6/1978 | Blanc et al. | 177/147 |
| 4,512,179 | 4/1985 | Umble et al. | 73/4 R |
| 4,621,263 | 11/1986 | Takenaka et al. | 340/870.07 |
| 4,961,898 | 10/1990 | Bogard et al. | 376/245 |
| 5,118,916 | 6/1992 | Hucik | 219/117.1 |
| 5,122,970 | 6/1992 | Gilbert et al. | 364/506 |
| 5,144,228 | 9/1992 | Sorna et al. | 324/158 P |
| 5,155,920 | 10/1992 | Jarrige-Lemas | 33/544 |
| 5,257,545 | 11/1993 | Au-Yang | 73/597 |
| 5,327,783 | 7/1994 | Au-Yang | 73/597 |

*Primary Examiner*—Donald P. Walsh
*Assistant Examiner*—Meena Chelliah
*Attorney, Agent, or Firm*—James E. McGinness

[57] ABSTRACT

A device for easily installing and removing strain gauge instrumentation and associated wiring on the inside of in-core monitor housings. A vibration sensor is attached to an inside diameter of a cylindrical housing. A signal cable is coupled to the vibration sensor and extends into an exterior of the reactor pressure vessel. A protective assembly minimizes the damage inflicted on the signal cables during handling. The signal cables are helically wound in an annular space between a pair of concentric thin-walled tubes and then passed through cable penetration bores formed in the body of a flange insert. The flange insert supports the concentric tube assembly and is sandwiched between the housing flange and the in-core monitor instrument flange of a conventional in-core monitor assembly.

22 Claims, 4 Drawing Sheets

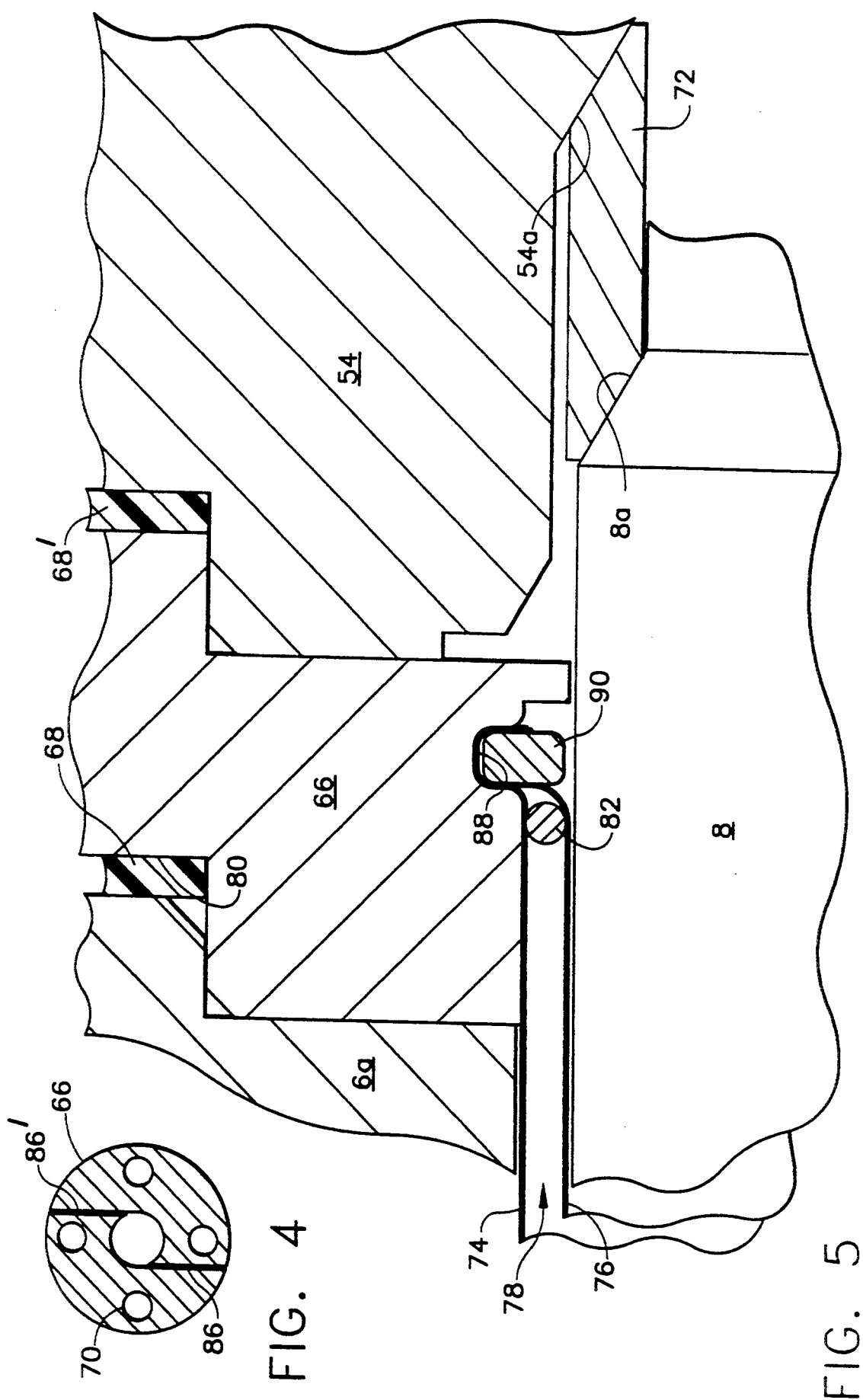

STRAIN GAUGE INSTRUMENTATION DEVICE FOR IN-CORE MONITOR HOUSINGS

FIELD OF THE INVENTION

This invention relates to monitoring of operating conditions inside a water-moderated nuclear reactor. In particular, the invention relates to monitoring of flow-induced vibrations in the internal components of a nuclear reactor.

BACKGROUND OF THE INVENTION

Flow-induced vibrations (FIVs) of the internal components of a nuclear reactor may cause fatigue-initiated cracking and/or component failure of those components. Because of the safety hazards associated with component failure in a nuclear reactor, it is necessary that the state or condition of internal components susceptible to vibration-induced damage be carefully monitored.

A conventional technique for monitoring and determining flow-induced vibrations is to attach vibration sensing instruments to the reactor internal components. Each vibration sensor is attached to a separate 1/16-inch-diameter mineral insulated (MI) signal cable to form a sensor string. To protect the MI signal cable from mechanical damage during installation and from the reactor environment during operation, protective conduits are used to encase the MI signal cables, each conduit encasing multiple cables. For example, such protective conduits can comprise 0.375-inch-diameter stainless steel tubing which is bracketed to components inside the reactor pressure vessel. Signal cables from the vibration sensors are routed within the reactor pressure vessel to a pressure boundary seal located in the vessel top head, through the drywell and to a data acquisition system in the reactor building.

One type of internal reactor component which is monitored to determine flow-induced vibrations therein is the in-core monitor housing. Core power is monitored by neutron flux monitors located within in-core monitor instruments supported by in-core monitor support assemblies. Each in-core monitor support assembly includes an instrumentation guide tube and an in-core monitor housing. The vibration sensor is conventionally mounted on the outside diameter of the in-core monitor housing.

Upon completion of FIV testing, the instruments, MI cables and protective conduits are removed to the extent possible. The respective accessibility of each item of equipment determines the extent to which removal is possible. To date, it has not been possible to remove the instruments, MI cables or conduits attached to components, such as the in-core monitor housing, which are located in the reactor lower plenum region. i.e., below the core plate.

Thus there is a need for a method and device to facilitate removal of all FIV instruments, cables, conduits, and associated equipment after completion of FIV testing. This includes sensors, conduits and equipment located in inaccessible regions below the core plate which current methods and technology cannot remove.

SUMMARY OF THE INVENTION

The present invention is a method and an apparatus for facilitating installation and removal of FIV instrumentation and associated equipment from inside the reactor pressure vessel. The FIV instrumentation of concern to the invention consists of two strain gauges which are attached to the upper portion of the in-core monitor housings within the reactor lower plenum region. In accordance with the teaching of the present invention, the strain gauges are positioned on the inside diameter of the in-core monitor housing instead of on the outside diameter, as has been the past practice. Relocating these instruments to the inside diameter of the in-core monitor housing permits the MI signal cables to be routed to outside the reactor pressure vessel through a flange insert located between the in-core monitor instrument flange and the in-core monitor housing flange. This design makes the FIV instrumentation and associated equipment accessible from below the reactor pressure vessel for removal and installation.

The MI signal cables are very small in diameter and require support and protection from damage during the insertion of the local power range monitor (LPRM) instrument. This protection and support is provided by two concentric thin-walled tubes between which the MI signal cables are routed. These support tubes are attached to each other by spot welding or other suitable means to increase the assembly stiffness. Further, the support tubes are attached to the flange insert, making an easily handled assembly of the instruments, cables, and pressure boundary penetration. Thus complete removal is easily achieved by unbolting the in-core monitor instrument flange and extracting the FIV instrumentation flange insert with the attached MI signal cables and support tubes.

The strain gauge instrumentation device in accordance with the invention comprises a pair of vibration sensors and associated MI signal cables. The vibration sensors are attached to an inside diameter of the in-core monitor housing. The signal cables extend into the exterior of the reactor pressure vessel through a brazed or welded penetration in the flange insert. A protective assembly minimizes the damage inflicted on the signal cables during insertion operations. The signal cables are helically wound in an annular space between a pair of concentric thin-walled tubes and then passed through and brazed or welded to respective cable penetration bores formed in the body of a flange insert. The flange insert supports the concentric tube assembly and is sandwiched between the in-core monitor housing flange and the in-core monitor instrument flange of a conventional in-core monitor assembly.

BRIEF DESCRIPTION OF THE DRAWINGS

FIG. 4 is a sectional view taken along a radial plane through a flange insert incorporated in the device shown in FIG. 3.

FIG. 5 shows in greater detail that portion of FIG. 3 including the coupling between a tube assembly and the flange insert.

DETAILED DESCRIPTION OF THE PREFERRED EMBODIMENTS

The present invention is a method and a device for facilitating installation and removal of instrumentation and associated equipment for monitoring flow-induced vibrations in an in-core monitor housing of a boiling water reactor (BWR) during reactor operation.

Figure 1:
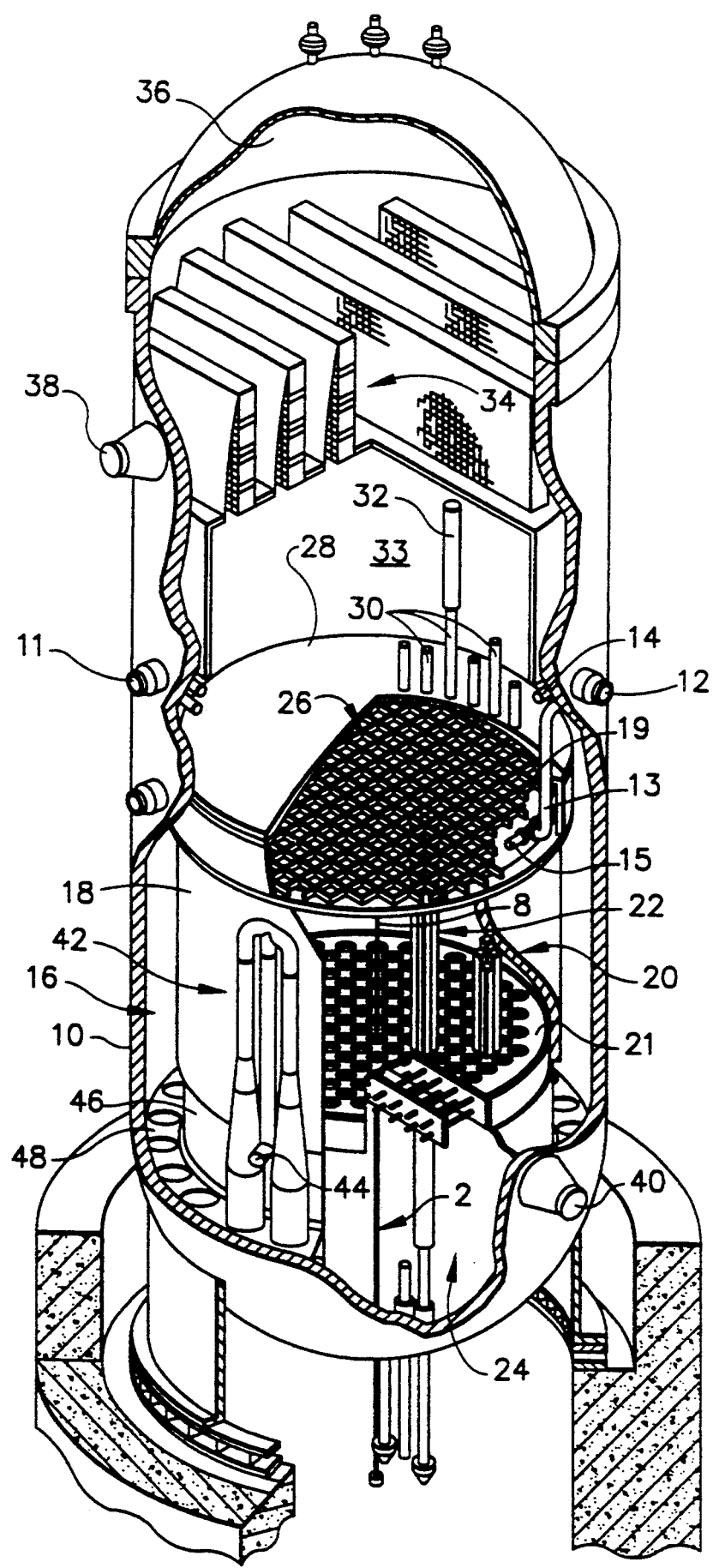
FIG. 1 is a schematic showing a partially cutaway perspective view of a conventional BWR.

The fluid flow in a boiling water reactor will be generally described with reference to FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder which surrounds the core 20 comprising numerous fuel assemblies 22 (only two 2×2 arrays of which are depicted in FIG. 1). Each fuel assembly is supported at the top by top guide 19 and at the bottom by core plate 21. Water flowing through downcomer annulus 16 then flows to the core lower plenum 24.

The water subsequently enters the fuel assemblies 22 disposed within core 20, wherein a boiling boundary layer (not shown) is established. A mixture of water and steam enters core upper plenum 26 under shroud head 28. Core upper plenum 26 provides standoff between the steam—water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 40 and forced by a centrifugal recirculation pump (not shown) into jet pump assemblies 42 (only one of which is shown) via recirculation water inlets 44. The BWR has two recirculation pumps, each of which provides the driving flow for a plurality of jet pump assemblies. The jet pump assemblies are circumferentially distributed around the core shroud 18.

The core shroud 18 is supported by RPV shroud support 46, which is welded to shroud 18, and by annular shroud support plate 48, which is welded at its inner diameter to the RPV shroud support 46 and at its outer diameter to RPV 10.

Figure 2:
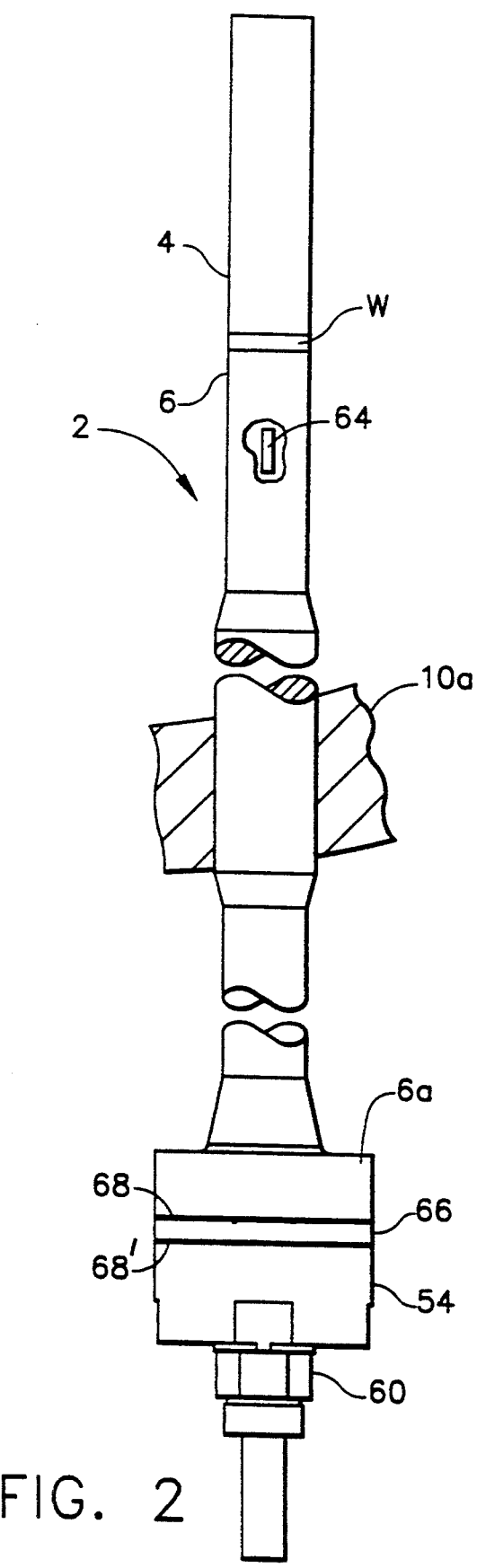
FIG. 2 is a side view of an in-core monitor housing having a strain gauge instrumentation device installed therein in accordance with the preferred embodiment of the invention.

Core power is monitored by neutron flux monitors located within in-core monitor instruments 8. Each in-core monitor instrument 8 is supported by an in-core monitor support assembly 2 which includes an instrumentation guide tube ,4 and an in-core monitor housing 6 connected by a weldment W (see FIGS. 2 and 3). As shown in FIG. 2, each in-core monitor housing 6 extends upwardly through bottom head 10a and into the interior of RPV 10. In-core monitoring instruments 8 are inserted into the fuel core 20 from above and through the in-core monitor support assembly 2. Motion of instrument 8 below the core region 20 is guided vertically by instrumentation guide tube 4 (see FIG. 3). The guide tube 4 is an extension of the in-core monitor housing 6 and is welded to the top of the housing after the strain gauges (described below) have been attached to the housing inner diameter. The guide tube extends from the top of housing 6 to the core plate 21 and supports instrument 8 in the=region below the core plate. The instrument 8 extends upward through the core region 20 to the top guide 19. Instrument 8 is supported in the core region by the fuels channels and therefore no guide tube is needed in the core-region.

The in-core monitor housing 6 has a flange 6a located external to RPV 10. In a conventional assembly, an in-core monitor instrument flange 54 is bolted to housing flange 6a by a plurality of bolts (not shown) which pass through unthreaded bores 56 in in-core monitor instrument flange 54 and are screwed into threaded bores 58 in housing flange 6a. The housing flange 6a has four threaded bores which are respectively collinear with the four unthreaded bores in in-core monitor instrument flange 54.

It is conventional practice to insert in-core monitor instrument 8 into in-core monitor support assembly 2 from the top. The instrument 8 slides down through the central bores of guide tube 4 and housing 6 and then into the central bore of in-core monitor instrument flange 54. The in-core monitor instrument 8 has a conical surface 8a (see FIG. 5) which, in the absence of the present invention, abuts a conical seat 54a formed in the central bore of in-core monitor instrument flange 54. This abutment prevents further downward displacement of in-core monitor instrument 8. An in-core nut 60 is then screwed tight onto a threaded outer circumferential surface of in-core monitor instrument 8 to lock the latter in place. A seal 62 embedded in the bottom end of in-core nut 60 bears against an outer circumferential surface of in-core monitor instrument 8 to seal the annular gap between in-core monitor instrument 8 and in-core nut 60.

Figure 3:
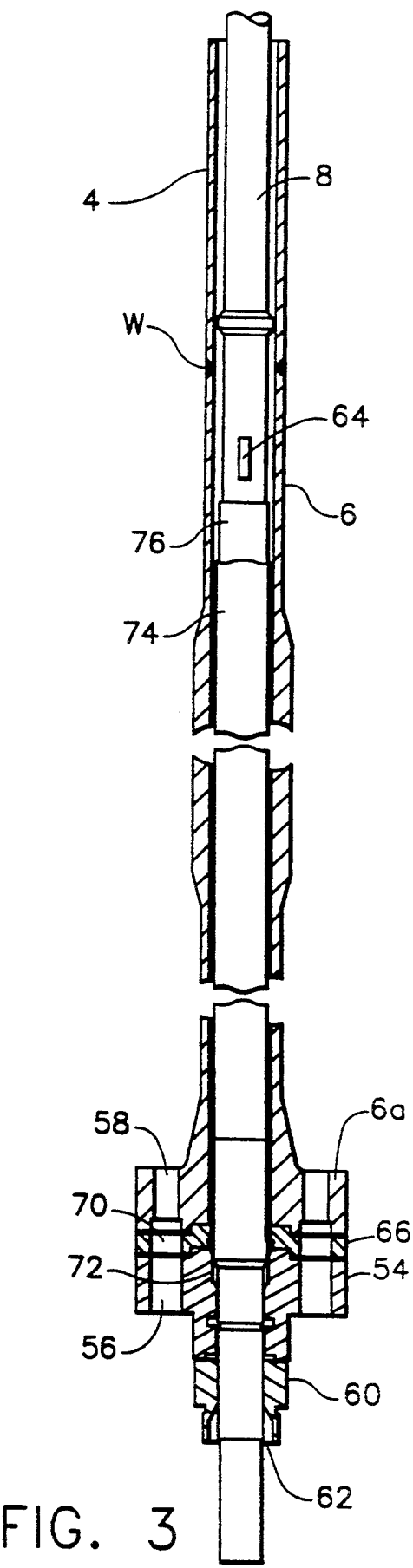
FIG. 3 is a sectional view, taken along an azimuthal plane, of the strain gauge instrumentation device in accordance with the preferred embodiment of the invention, installed in an in-core monitor housing.

In accordance with the present invention, a pair of strain gauges 64 and 64' (shown prior to mounting in FIG. 6) are mounted on the inside diameter of the in-core monitor housing 6 at angular positions separated by 90°. Only one strain gage 64 is shown in FIGS. 2 and 3. Each strain gauge is connected via a respective MI signal cable to data acquisition means (not shown) external to RPV 10.

After the strain gauges have been installed and the guide tube 4 has been welded to housing 6, the in-core monitor instrument 8 is inserted in guide tube 4 from above. To ensure that the MI signal cables are not damaged during either strain gauge installation or in-core monitor instrument insertion, a novel assembly is used to support and protect the signal cables. A flange insert 66 is sandwiched between housing flange 6a and in-core monitor instrument flange 54 with gaskets 68, 68' therebetween, as shown in FIGS. 2 and 3. Unthreaded bores 70 are provided in alignment with the corresponding bores of housing flange 6a and in-core monitor instrument flange 54 to allow the assembly to be bolted together. The presence of the flange insert 66 means that the in-core monitor instrument flange 54 is displaced downward relative to the housing flange 6a by a distance equal to the thickness of flange insert 66. To maintain the in-core monitor instrument 8 at the same elevation, a sealing insert 72 of height equal to the thickness of flange insert 66 is inserted between the conical surface 8a and the conical seat 54a, as seen in FIGS. 3 and 5. Sealing insert 72 is a metal ring having concentric inner and outer circular cylindrical surfaces and conical end surfaces configured to conform to conical surface 8a and conical seat 54a, respectively. Thus, the in-core monitor instrument 8 will seat on and be supported by the upper conical end surface of sealing ring 72.

Figure 6:
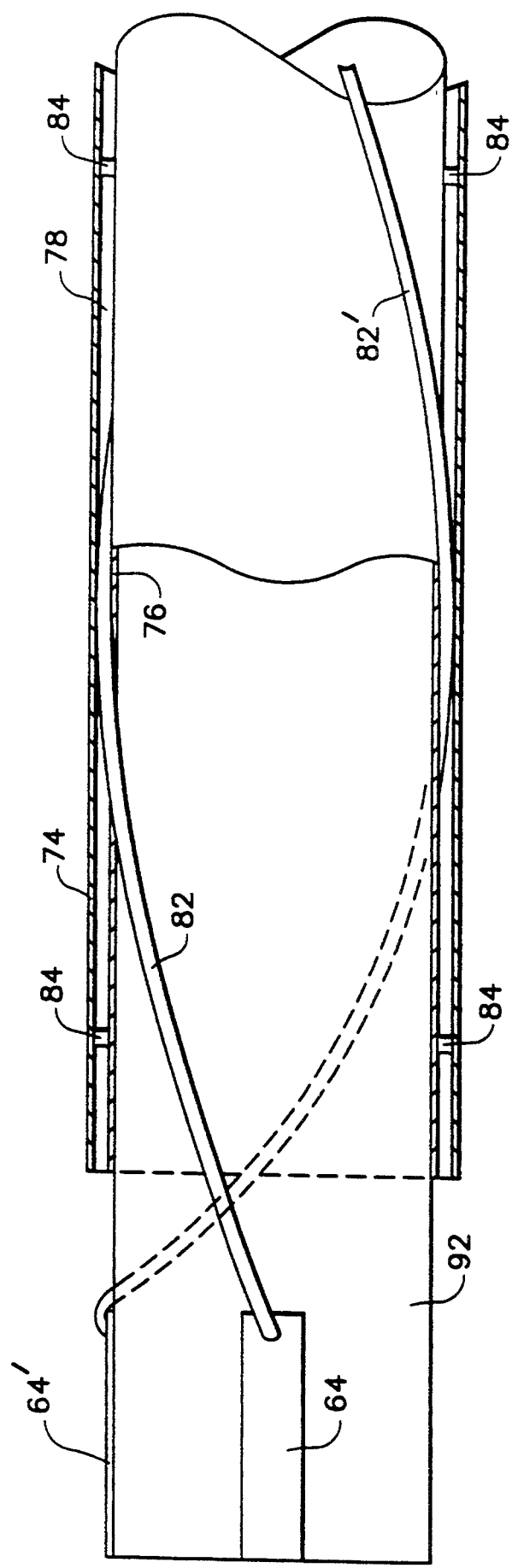
FIG. 6 is a schematic representation showing a pair of MI signal cables helically wound in an annular space between concentric thin-walled tubes in accordance with the preferred embodiment of the invention.

As best seen in FIG. 5, the strain gauge instrumentation device of the present invention is an assembly comprising the flange insert 66, an outer thin-walled tube 74 and an inner thin-walled tube 76. Preferably, the wall thickness of tubes 74 and 76 is on the order of 4 mils. The diameter of outer tube 74 is greater than the diameter of inner tube 76, with inner tube 76 being concentrically arranged inside outer tube 74. Respective portions of two MI signal cables are helically wound in the annular space 78 between tubes 74 and 76, the helical winding starting at the bottom of the tubes depicted in FIG. 5 and terminating at the top of tubes 74 and 76 as shown in FIG. 6. The length of tubes 74 and 76 will depend on the length of the in-core monitor housing 6 which is to be FIV tested. For a known in-core monitor housing having a length of 181.66 inches, tubes 74 and 76 will extend to a distance of about 170 inches from the radial plane of surface 80 (see FIG. 5).

As shown in FIG. 6, the signal cables 82, 82' are routed through the annular space 78 between tubes 74 and 76. The concentric portions of tubes 74 and 76 are spiral spot-welded to increase the stiffness of the assembly. The spot welds 84 are positioned between the signal cables.

The signal cables 82 and 82' enter annular space 78 via respective cable penetration bores 86 and 86' formed in flange insert 66 (see FIG. 4) and via respective penetration holes (not shown) formed in outer tube 74. The space between the penetration bore and the signal cable is sealed by welding or brazing to preserve the pressure boundary between the interior and exterior of the RPV. The signal cables 82 and 82' exit annular space 78 at the top of tubes 74 and 76. The strain gauges 64 and 64' are connected to these protruding ends of signal cables 82 and 82'.

The lower ends of tubes 74 and 76 are pressed together into an annular groove 88 in flange insert 66 and held there by a tube retaining ring 90 (see FIG. 5). Ring 90 is of the snap-fit variety, having a through gap which enables flexing of the ring to fit through a smaller-diameter ]portion of the central bore of flange insert 66. When the flexed ring is axially aligned with annular groove 88, the ring is released to snap radially outwardly and into an annular groove formed in the pressed ends of tubes 74 and 76. The opposed ends of the ring are then butt-welded together, thereby securely coupling the tubes 74 and 76 to the flange insert. This coupling further increases the stiffness of the tube assembly. The entire assembly can be handled as a single unit, thereby facilitating installation and removal of the strain gauges and MI signal cables incorporated therein.

A special insertion technique is used to achieve damage-free installation of the assembly inside the in-core monitor housing 6. This technique utilizes a mandrel 92 as the insertion tool (see FIG. 6). The mandrel is simply a circular cylindrical pipe having a radially outwardly directed flange (not shown) at one end only. The diameter of the cylindrical mandrel body is less than the diameter of inner tube 76 so that the mandrel body can be slid inside the tube assembly. The diameter of the mandrel flange is greater than the inner tube diameter so that the flange can support the flange insert 66. This support facilitates insertion of the assembly inside in-core monitor housing 6.

The mandrel has sufficient length that its top end extends above the top end of inner tube 76 when the mandrel and the assembly are coupled. The two strain gauges attached to the protruding ends of the MI signal cables are then adhered to the outer circumferential surface of the mandrel to temporarily secure the strain gauges during insertion of the assembly into the in-core monitor housing 6.

Before the assembly is inserted, gasket 68 must be installed from the upper end and positioned correctly on flange insert 66 as shown. During insertion, the assembly is supported on the flange of the mandrel 92, which is pushed up into the in-core monitor housing 6 by a suitable tool. When the assembly is in its final position, i.e., with flange insert 66 abutting housing flange 6a, a suitable tool is used to hold the flange insert in place temporarily while the mandrel is removed. During sliding out of the mandrel, the strain gauges are separated from the mandrel by the tension applied by the signal cables as the mandrel is pulled out. After the mandrel has been fully removed, the sealing ring 72 is placed in position on in-core monitor instrument flange 54, which is then bolted on, thereby sandwiching flange insert 66 and securing the tube assembly relative to in-core monitor housing 6.

The next step in the procedure is to weld the strain gauges to the inside diameter of in-core monitor housing 6 by entering the latter from the top. Then the instrumentation guide tube 4 is welded to the in-core monitor housing 6 (see weld W in FIGS. 2 and 3). The next step in the procedure is to install the in-core monitor instrument 8 from the top. The strain gauges 64, 64', which have been welded to the inside diameter of in-core monitor housing 6, lie outside the path of the in-core monitor instrument 8. The instrument 8 enters the inner tube 76 and slides downward until the conical surface 8a seats on the opposing conical seat formed on the upper end of sealing ring 72. In-core monitor instrument 8 is then locked in place by screwing in-core nut 60 tightly thereon.

In this manner, during slidable insertion of the assembly inside the in-core monitor housing 6, the MI signal cables 82 and 82' are protected against damage by the barrier of outer tube 74. Similarly, during slidable insertion of instrument 8 into the assembly, the MI signal cables 82 and 82' are protected against damage by the barrier of inner tube 76.

After FIV testing has been completed, the strain gauges and MI signal cables must be removed. This is accomplished by unscrewing in-core nut 60; pulling in-core monitor instrument 8 out via the top of instrumentation guide tube 4; unbolting in-core monitor instrument flange 54 from in-core monitor housing flange 6a; and pulling the assembly out from the bottom of the in-core monitor housing 6, leaving behind the welded strain gauges 64, 64' which separate from the ends of the respective signal cables 82, 82'. The strain gauges are then removed by reaming the bore of in-core monitor housing 6. Reactor coolant water is prevented from leaking out of the in-core monitor housing 6 by temporarily plugging the guide tube 4 at its upper end. Then the in-core monitor instrument flange 54, in-core monitor instrument 8 and in-core nut 60 can be reinstalled in conventional fashion.

The preferred embodiment of the strain gauge instrumentation device in accordance with the invention has been disclosed for the purpose of illustration. Variations and modifications of the disclosed structure which do not depart from the concept of this invention will be readily apparent to engineers skilled in the art of designing equipment for monitoring nuclear reactors. For example, the invention is not limited to devices used with strain gauges or to devices installed in in-core monitor housings. Furthermore, although the signal cable penetration is sealed in accordance with the preferred embodiment by welding or brazing, any other conventional sealing technique can be used, e.g., silver soldering, a compression-type fitting or swaging. All such variations and modifications are intended to be encompassed by the claims set forth hereinafter.

I claim:

1. A method for monitoring flow-induced vibration in a cylindrical housing which extends upwardly through a bottom head of and into an interior of a reactor pressure vessel of a nuclear reactor, comprising the steps of:
   connecting a vibration sensor to one end of a signal cable; and
   attaching said vibration sensor to an inside surface of said cylindrical housing,
   whereby said one end of said signal cable lies inside said reactor pressure vessel, another end of said signal cable lies outside said reactor pressure vessel and an intermediate portion of said signal cable penetrates said reactor pressure vessel.

2. The method as defined in claim 1, wherein said cylindrical housing has a circular cross section, and the following steps are performed prior to said step of attaching said vibration sensor to said inside surface of said cylindrical housing:
   arranging a portion of said signal cable in an annular space between a pair of concentric thin-walled tubes with said vibration sensor outside of said annular space;
   spot welding said thin-walled tubes to each other to form an assembly; and
   inserting said assembly inside said cylindrical housing.

3. The method as defined in claim 1, wherein said cylindrical housing is an in-core monitor housing.

4. The method as defined in claim 1, wherein said vibration sensor comprises a strain gage.

5. The method as defined in claim 1, wherein said step of inserting said assembly inside said cylindrical housing comprises the steps of:
   inserting a mandrel inside an inner one of said thin-walled tubes, said mandrel having a flange for supporting said assembly;
   adhering said vibration sensor to a surface of said mandrel; and
   sliding said coupled mandrel and assembly inside said cylindrical housing.

6. The method as defined in claim 5, further comprising the step of removing said mandrel from said assembly before said step of attaching said vibration sensor to said inside surface of said cylindrical housing.

7. An apparatus for monitoring flow-induced vibration of a cylindrical housing which extends upwardly through a bottom head of and into an interior of a reactor pressure vessel of a nuclear reactor, comprising:
   a vibration sensor attached to an inside surface of said cylindrical housing; and
   a signal cable coupled to said vibration sensor at a location inside said reactor pressure vessel and extending through the reactor pressure vessel and into an exterior of said reactor pressure vessel.

8. The apparatus as defined in claim 7, further comprising means for protecting a first portion of said signal cable located inside said cylindrical housing, and penetration means for passing a second portion of said signal cable through a pressure boundary between said interior and said exterior of said vessel.

9. The apparatus as defined in claim 8, wherein said protecting means comprises an outer thin-walled tube and an inner thin-walled tube, said inner tube being arranged concentrically inside said outer tube to form an annular space therebetween, said first portion of said signal cable residing in said annular space.

10. The apparatus as defined in claim 9, wherein said first portion of said signal cable is helically wound around said inner tube.

11. The apparatus as defined in claim 9, wherein said inner and outer tubes are spot-welded together.

12. The apparatus as defined in claim 9, wherein said inner and outer tubes each have a wall thickness on the order of 4 mils.

13. The apparatus as defined in claim 9, wherein said penetration means comprises a bore formed in a flange insert and a hole formed in said outer tube, said flange insert being adapted to be sandwiched between a pair of flanges, one of said pair of flanges being integrally joined to said cylindrical housing, and further comprising means for attaching said inner and outer tubes to said flange insert so that said bore is in communication with said annular space.

14. The apparatus as defined in claim 13, further comprising means for sealing a space between said bore and said second portion of said signal cable to form said pressure boundary.

15. The apparatus as defined in claim 14, wherein said sealing means comprises fused braze or weld material.

16. The apparatus as defined in claim 9, wherein said attaching means comprises a snap ring with buttwelded ends which seats in an annular groove formed in an inner circumferential surface of said flange insert.

17. An instrumentation assembly comprising:
   a first tube having a circular cylindrical portion of first diameter connected to a retained portion;
   a second tube having a circular cylindrical portion of second diameter connected to a retained portion, said second diameter being less than said first diameter;
   means for supporting said circular cylindrical portion of said first tube in a concentric position relative to said circular cylindrical portion of said second tube, said supporting means being connected to an inner surface of said circular cylindrical portion of said first tube and to an outer surface of said circular cylindrical portion of said second tube;
   a signal cable having a first portion which is routed through a space between said circular cylindrical portions of said first and second tubes and having second and third portions which are not routed in said space, said second and third portions being connected to opposite ends of said first portion;

a generally annular body comprising a central bore for receiving said retained portions of said first and second tubes and a penetration bore for receiving said second portion of said signal cable;

means for attaching said retained portions of said first and second tubes to said generally annular body; and an instrument connected to said third portion of said signal cable.

18. The instrumentation assembly as defined in claim 17, wherein said instrument is a vibration sensor.

19. The instrumentation assembly as defined in claim 17, wherein said supporting means comprises a multiplicity of spot welds.

20. The instrumentation assembly as defined in claim 17, wherein said first-and second tubes each have a wall thickness on the order of 4 mils.

21. The instrumentation assembly as defined in claim 17, wherein said attaching means comprises a snap ring with butt-welded ends which seats in an annular groove formed in said central bore of said generally annular body, said retained portions of said first and second tubes being arranged between said snap ring and said annular groove.

22. The instrumentation assembly as defined in claim 17, wherein said circular cylindrical portion of said first tube has a penetration hole formed therein which is in communication with penetration bore, said signal cable extending from said annular space into said penetration bore via said penetration hole.

* * * * *